United States Patent
Singh et al.

(10) Patent No.: US 10,452,642 B1
(45) Date of Patent: Oct. 22, 2019

(54) DETECTING AND PINPOINTING DATA CORRUPTION

(71) Applicant: Tintri by DDN, Inc., Chatsworth, CA (US)

(72) Inventors: Pratap V. Singh, Mountain View, CA (US); Shobhit Dayal, San Francisco, CA (US); Edward K. Lee, Dublin, CA (US); Mark G. Gritter, Eagan, MN (US)

(73) Assignee: Tintri by DDN, Inc., Chatsworth, CA (US)

( * ) Notice: Subject to any disclaimer, the term of this patent is extended or adjusted under 35 U.S.C. 154(b) by 443 days.

(21) Appl. No.: 15/074,492

(22) Filed: Mar. 18, 2016

Related U.S. Application Data

(60) Provisional application No. 62/136,231, filed on Mar. 20, 2015.

(51) Int. Cl.
*G06F 16/23* (2019.01)
*G06F 16/22* (2019.01)

(52) U.S. Cl.
CPC ...... *G06F 16/2365* (2019.01); *G06F 16/2228* (2019.01)

(58) Field of Classification Search
None
See application file for complete search history.

(56) References Cited

U.S. PATENT DOCUMENTS

| | | | | |
|---|---|---|---|---|
| 5,493,649 A | * | 2/1996 | Slivka | G06F 11/10 714/38.13 |
| 6,952,797 B1 | * | 10/2005 | Kahn | G06F 11/1076 714/758 |
| 6,996,722 B1 | * | 2/2006 | Fairman | G06F 21/10 380/239 |
| 7,415,653 B1 | * | 8/2008 | Bonwick | G06F 11/1004 711/162 |
| 8,037,345 B1 | * | 10/2011 | Iyer | G06F 11/1004 714/20 |
| 2010/0325519 A1 | * | 12/2010 | Lyon | G11B 20/1833 714/758 |

* cited by examiner

*Primary Examiner* — Richard L Bowen
(74) *Attorney, Agent, or Firm* — Van Pelt, Yi & James LLP

(57) ABSTRACT

Detecting and pinpointing data corruption is disclosed, including: storing an object-level metadata structure corresponding to a stored object, wherein the stored object comprises a plurality of blocks; and determining for a block included in the plurality of blocks, based at least in part on a piece of identifying information of the block, two or more locations in the object-level metadata structure at which to store a value computed based at least in part on data comprising the block.

17 Claims, 12 Drawing Sheets

DETECTING AND PINPOINTING DATA CORRUPTION

CROSS REFERENCE TO OTHER APPLICATIONS

This application claims priority to U.S. Provisional Patent Application No. 62/136,231 entitled DETECTING AND PIN-POINTING DATA CORRUPTION filed Mar. 20, 2015 which is incorporated herein by reference for all purposes.

BACKGROUND OF THE INVENTION

Conventional systems normally maintain a checksum per block of data and store the checksum with the block. This allows the conventional systems to perform integrity checks that can show that data is corrupted but not catch errors like reordering, lost writes, or corruptions before it was added to the metadata. These conventional systems also cannot pinpoint the corruption location in a piece of data.

Some other conventional systems maintain hierarchical checksums to pinpoint the corrupted regions. Hierarchical checksums involve generating checksums based on portions of an object and then generating an overall checksum for the object based on the checksums corresponding to the portions of the object. However, hierarchical checksums come at a cost of a larger amount of metadata that scales with the size of the object.

BRIEF DESCRIPTION OF THE DRAWINGS

Various embodiments of the invention are disclosed in the following detailed description and the accompanying drawings.

DETAILED DESCRIPTION

Figure 1:
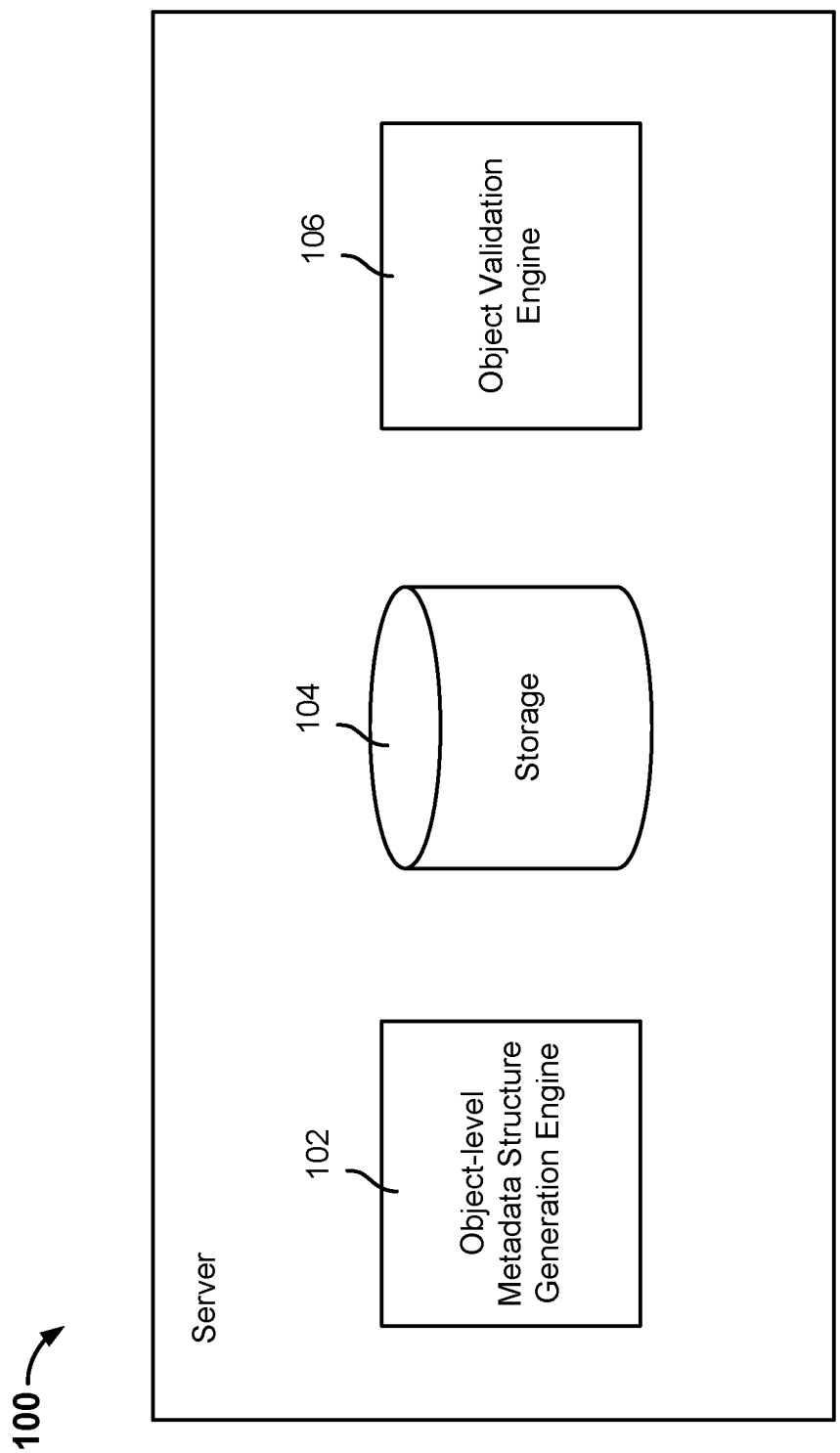
FIG. 1 is a diagram of a server for detecting and pinpointing data corruption in accordance to some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of detecting and pinpointing data corruption are described herein. In various embodiments, one or more object-level metadata structures corresponding to a stored object are stored. For example, the object can be a file or a logical unit number (LUN). The object comprises a plurality of blocks of data and each block is associated with a corresponding checksum. In various embodiments, a "block" of an object is a unit of user data that is organized by a storage system. In some embodiments, the blocks are typically 4 KB to 8 KB in size and can be addressed individually and modified or read based on user operations. In various embodiments, storage systems also use metadata to track these blocks, e.g., the offset of the block, the size, the reference counts, etc. In various embodiments, for each block of the object, based on a piece of identifying information of the block, two or more locations in the object-level metadata structure at which to store a value computed based at least in part on a value (e.g., checksum) corresponding to that block are determined.

Embodiments of maintaining high-resolution consistency for data at rest are described herein. In various embodiments, the high-resolution consistency is performed at the resolution of one or more blocks of an object and stored in an object-level metadata structure. The object-level metadata structure as described herein utilizes simple checksums for data blocks and organizes them in a way that is easy and fast to maintain. The object-level metadata structure can be used to find inconsistencies at the block level for an object. In various embodiments, an object-level metadata structure allows the storage system to detect corruptions in the stored object and quickly point out the one or more blocks of the object that are potentially corrupted.

FIG. 1 is a diagram of a server for detecting and pinpointing data corruption in accordance with some embodiments. In some embodiments, server 100 comprises a standalone system. In some embodiments, server 100 comprises a component of a storage system. In the example, server 100 comprises object-level metadata structure generation engine 102, storage 104, and object validation engine 106. Each of object-level metadata structure generation engine 102 and object validation engine 106 can be implemented using hardware and/or software. Storage 104 can be implemented using one or more types of storage.

Object-level metadata structure generation engine 102 is configured to generate one or more object-level metadata structures per object. The object for which object-level metadata structure generation engine 102 is configured to generate an object-level metadata structure can be stored at storage 104. In various embodiments, the object comprises a file. In various embodiments, the object comprises various blocks of data. In various embodiments, a single object-level metadata structure is generated per object. In various embodiments, more than one object-level metadata structure is generated per object. In various embodiments, each object-level metadata structure has a fixed size regardless of the size of the object it tracks. Put another way, the per object metadata structure is always a fixed size for any sized object. This helps limit the amount of metadata that is used to store the block checksums for objects and helps reduce internal inefficiencies for storing data. In various embodiments, each block of an object is associated with a checksum. In some embodiments, the checksum of each block of an object is computed by object-level metadata structure generation engine 102. In some embodiments, the checksum of each block of an object is computed by an entity other than object-level metadata structure generation engine 102 and is otherwise obtained by object-level metadata structure generation engine 102. In some embodiments, the checksum of each block of an object is a content-based checksum. For example, the checksum of a block can be based on cyclic redundancy check (CRC), Adler-43, or secure hash algorithm (e.g., SHA1). The checksum of a block is updated whenever the data of the block is updated.

In various embodiments, each object-level metadata structure comprises M sections (where M>1) and each section comprises N locations (where N>1), which is also sometimes referred to herein as "bins." In various embodiments, the checksum of each block of an object is mapped to a corresponding bin in each section of an object-level metadata structure associated with that object. In various embodiments, at least a portion of a piece of identifying information of the block is used to map the checksum of the block to the two or more bins across two or more respective sections of the object-level metadata structure associated with that object. In some embodiments, the piece of identifying information of the block that is used to map the checksum of the block to the two or more bins across two or more respective sections is the block's offset or another a unique location vector of the block. The checksum(s) of block(s) that are mapped to the same bin in a section are then combined (e.g., XOR'ed together) and the value resulting from the combination is stored in that bin. Put another way, in various embodiments, each block's checksum is transformed and stored in an object-level metadata structure that tracks checksums across all the blocks written for the object. In some embodiments, when a block of data is deleted from the object, its checksum is removed from the corresponding two or more bins in the object-level metadata structure. For example, removing a block's checksum from each corresponding bin can be done by XORing the checksum of the data being removed from the value stored in each such corresponding bin. In some embodiments, when a block of data is overwritten, the block of data's old checksum can be removed from the corresponding two or more bins in the object-level metadata structure and the data block's new checksum can be added to the corresponding two or more bins in the object-level metadata structure. In some embodiments, prior to storing checksum values of an object, an object-level metadata structure is initialized, in which all the bins in the object-level metadata structure are made to store the same default value (e.g., a zero value). Each time a block of an object is updated, its checksum is correspondingly updated and the bins of the object-level metadata structure to which the block maps are updated with the block's updated checksum value. This way, the object-level metadata structure(s) always reflect the data that is stored in the object. Example object-level metadata structures are described in further detail below.

Object-level metadata structure generation engine 102 is configured to store the one or more object-level metadata structures associated with the objects they track at storage 104. In some embodiments, each object-level metadata structure comprises a relatively lightweight size (e.g., 1 KB). As blocks of an object are updated, object-level metadata structure generation engine 102 updates the object-level metadata structures that are stored with the object. In some embodiments, each object stored at storage 104 is also stored with the checksums corresponding to the object's blocks.

Object validation engine 106 is configured to check for errors at the block level from objects stored at storage 104 or transmitted (e.g., across a network) to server 100 based on the object-level metadata structure(s) that are stored/transmitted with the objects (e.g., in the persistent metadata of the objects). In various embodiments, at a validation event, object validation engine 106 is configured to compute a new object-level metadata structure based on a stored object read from storage 104 or received at server 100 and compare the newly computed object-level metadata structure to the object-level metadata structure that was stored/transmitted with the object. For example, a validation event comprises a receipt of a read request to an object stored at storage 104 or a receipt of transmission of an object at server 100. Any discrepancies in the values stored in two or more corresponding bins between the newly computed object-level metadata structure and the object-level metadata structure that was stored/transmitted with the object can be used by object validation engine 106 to determine one or more blocks of the object at which errors might have occurred. The identified blocks of the object that are associated with potential errors can be used, for example, to initiate a debugging process and/or identify which blocks should be copied to the stored/received copy of the object from a safe (e.g., a known correct) version of the object. Examples of checking for errors at the block-level from stored/transmitted objects are described in further detail below.

In various embodiments, computing and updating the object-level metadata structure is dependent only on the content of the data stored in the system. In various embodiments, it is an end-to-end checksum that is completely independent of how the storage system is implemented. As such, the object-level metadata structure will detect data corruption caused by a very wide range of bugs and errors such as, for example, misplaced writes, lost writes, etc.

Figure 2:
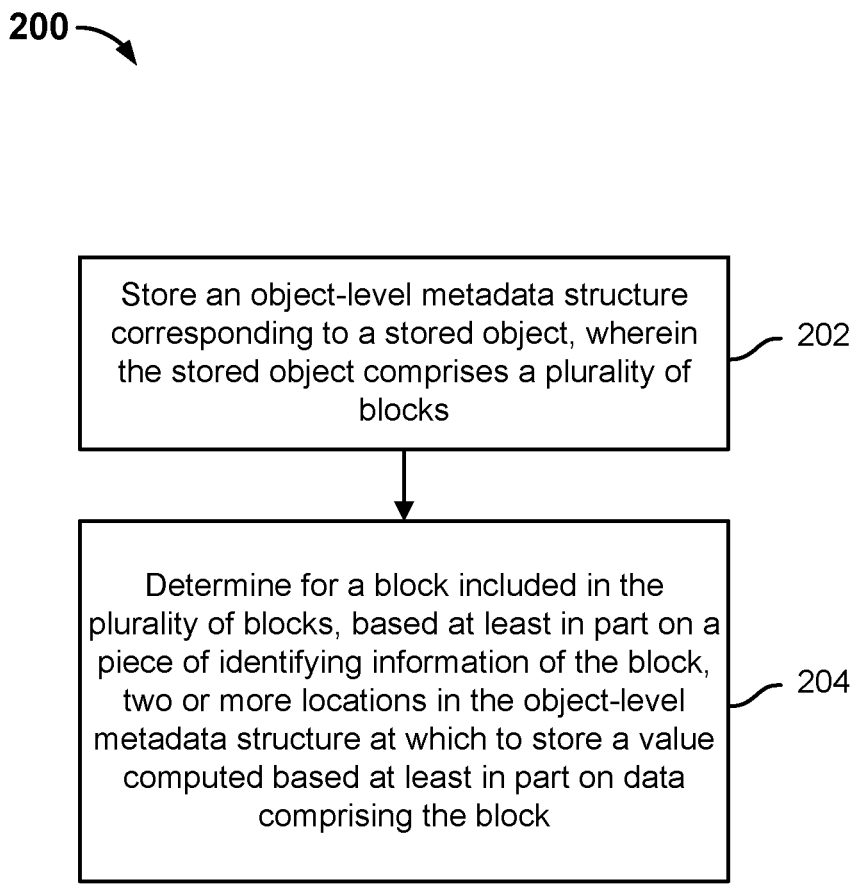
FIG. 2 is a flow diagram showing an example of a process for generating an object-level metadata structure in accordance to some embodiments.

FIG. 2 is a flow diagram showing an example of a process for generating an object-level metadata structure in accordance to some embodiments. In some embodiments, process 200 is implemented on a server such as server 100 of FIG. 1.

At 202, an object-level metadata structure corresponding to a stored object is stored, wherein the stored object comprises a plurality of blocks. In various embodiments, the object comprises a file or a LUN. The object comprises blocks of user data. In various embodiments, one or more metadata structures can be created to track block values (e.g., checksums) for the object. In some embodiments, prior to storing values determined based on the blocks of an object, the object-level metadata structure is initialized and a default value is stored in each location of the object-level metadata structure.

At 204, for a block included in the plurality of blocks, two or more locations in the object-level metadata structure at which to store a value computed based at least in part on data comprising the block is determined based at least in part on a piece of identifying information of the block. In various embodiments, the object-level metadata structure comprises M sections of N bins (locations). Each bin can be associated with an identifying value that is unique in the section in which the bin is located. Each bin also stores a value (which is not the same as the identifying value associated with the bin) that is determined based on the zero or more block values (e.g., block checksums) that have been mapped to that bin. At least a portion of a piece of identifying information of the block is used to identify two or more locations in an object-level metadata structure associated with the object in which to map a data associated with that block. In various embodiments, the data associated with the block that is mapped to two or more locations in the object-level metadata structure is the checksum that is determined based on the content of the block. In some embodiments, the data associated with the block that is mapped to two or more locations in the object-level metadata structure is a value other than a checksum that is determined based on the content of the block. In various embodiments, the piece of identifying information of the block that is used to map the block's checksum to two or more locations in a metadata structure is the block's offset. In some embodiments, at least a portion of the block's offset is used and this portion of the block's offset can be considered as multiple components, where each component corresponds to one of M sections of an object-level metadata structure. The checksum of the block is then mapped to a corresponding bin in each of the M sections of the object-level metadata structure based on a value of an offset component corresponding to that section. For example, if the offset of a block were eight bytes, the least significant four bytes could be used to map the block's checksum to the bins of the object-level metadata structure. Also, in this example, assume that the object-level metadata structure had M=4 sections, where each section of the object-level metadata structure corresponds to a corresponding byte of the block's selected four least significant bytes. Thus, the value of each byte of the selected four bytes of the offset is used to identify a bin associated with a corresponding identifying value in each of the four sections of the object-level metadata structure in which to map the block's checksum. Step 204 can be repeated for each block in the object such that each block's checksum is included in at least two bins (in at least two respective sections) of the object-level metadata structure.

In various embodiments, a block's offset uniquely maps to a set of two or more bins in an object-level metadata structure. However, more than one block's offset can be mapped to the same bin in a section of the object-level metadata structure. As the checksums of various blocks of the object are mapped to corresponding bins in the object-level metadata structure, in various embodiments, in the event that multiple blocks' checksums are mapped to the same bin in a section of the object-level metadata structure, the value that is stored in the bin is a combination of those blocks' checksums. For example, if both of block A and block B's checksums were mapped to one bin of a particular section of the object-level metadata structure, then the value that is stored in that bin is a combination of block A's checksum and block B's checksum. For example, the combination of multiple block checksums can be an XOR operation of those checksums.

Figure 3:
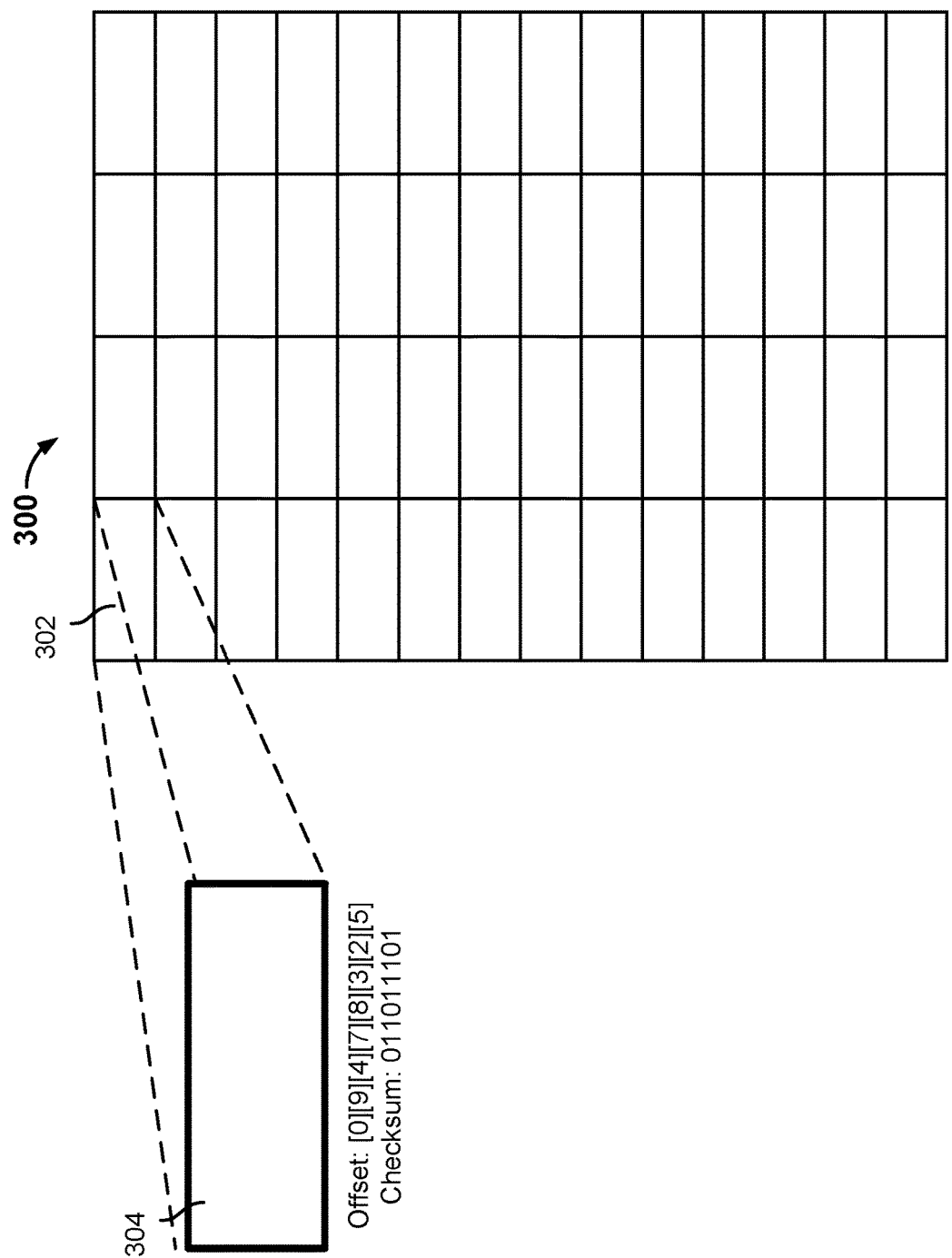
FIG. 3 is a diagram showing blocks of data in an object in accordance to some embodiments.

FIG. 3 is a diagram showing blocks of data in an object in accordance to some embodiments. In the example, object 300 can be a file that includes several blocks of data, such as block 302. Zoom-in 304 of block 302 shows that each data block is associated with metadata such as an offset and a checksum. For example, the offset of a block comprises eight byte values. In this example, the eight byte offset of block 302 comprises the following values: [0][9][4][7][8][3][2][5] (where the value of each byte is shown between a set of "[ ])." The checksum of block 302 that was computed based on the user data stored in block 302 is "01101101."

Figure 4:
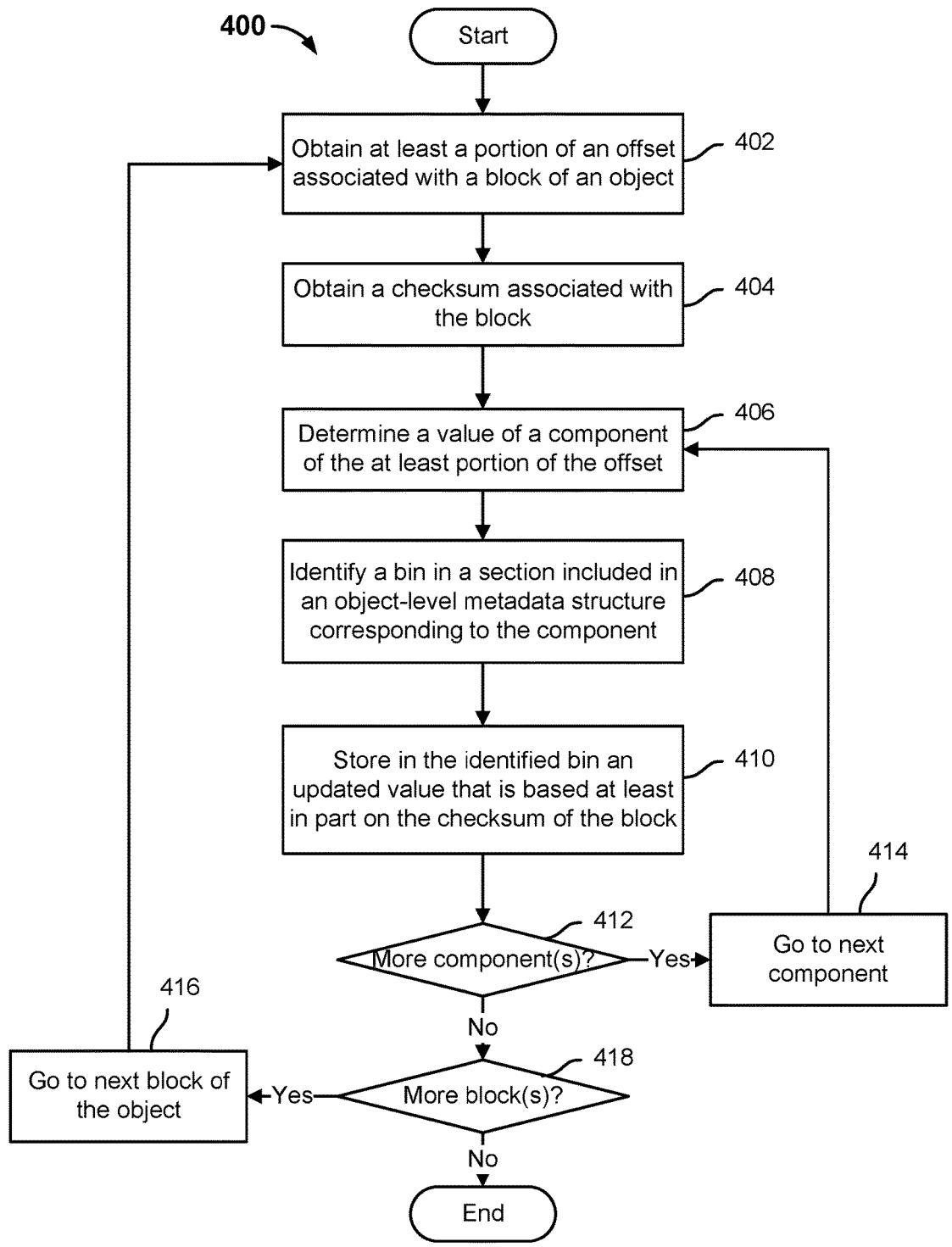
FIG. 4 is a flow diagram showing an example of a process for generating an object-level metadata structure corresponding to an object in accordance to some embodiments.

FIG. 4 is a flow diagram showing an example of a process for generating an object-level metadata structure corresponding to an object in accordance to some embodiments. In some embodiments, process 400 is implemented on a server such as server 100 of FIG. 1. In some embodiments, an object-level metadata structure for object 300 of FIG. 3 can be determined using a process such as process 400 of FIG. 4.

At 402, at least a portion of an offset associated with a block of an object is obtained. In some embodiments, a portion or the entirety of a block offset can be considered, depending on the desired resolution of the object-level metadata structure corresponding to the object. A tradeoff exists between a higher resolution object-level metadata structure that requires more storage space and a lower resolution object-level metadata structure that requires less storage space. For example, assuming that the object-level metadata structure includes one section for each component of a block's offset, the greater the portion of a block's offset that is used to map its checksum into the object-level metadata structure, the greater the size the metadata structure will be but the smaller likelihood that the two block's checksums will be mapped to the same bins of the metadata structure. Conversely, assuming that the object-level metadata structure includes one section for each component of a block's offset, the smaller the portion of a block's offset that is used to map its checksum into the object-level metadata structure, the smaller the size the metadata structure will be but the greater likelihood that the two blocks' checksums will be mapped to the same bins of the metadata structure. Mapping fewer blocks' checksums to the same bins will result in more precise determinations of blocks that are potentially associated with data corruption. How much of a block offset is considered can be determined by a user configuration. In embodiments in which less than the entire offset of a block is considered, the offset includes multiple components/values (e.g., bytes) and a predetermined number of least significant components (e.g., the least significant four bytes) of an offset can be considered.

At 404, a checksum associated with the block is obtained. The checksum associated with the block can be computed and/or otherwise obtained. For example, the block checksum can be computed based using CRC, SHA1, or Adler-43.

At 406, a value of a component of the at least portion of the offset is determined. The value of one component of the obtained at least portion of the block's offset is determined.

At 408, a bin in a section included in an object-level metadata structure corresponding to the component is identified. The object-level metadata structure includes M sections, where M is the same value as the number of components that are obtained for each block offset. For example, if the least significant four bytes are obtained for the block, then M=4. Each of the M=4 sections include N bins. For example, if each component of the obtained block offset is one byte (eight bits), then each section could have $N=2^8=256$ bins. Each bin would be associated with a corresponding identifying value from 0 to 255. The bin that is associated with the identifying value that matches the value of the current component of the obtained at least portion of the block's offset that is being considered is identified.

At 410, an updated value that is based at least in part on the checksum of the block is stored in the identified bin. The bin of the section of the object-level metadata structure to which the value of the current component of the obtained at least portion of the block's offset maps is updated with a new value. Specifically, the previous value stored in that bin is combined with the checksum of the block and the new combined value is stored in that bin. For example, the combination is an XOR operation or a summation operation.

At 412, it is determined whether there are additional components in the obtained at least portion of the offset associated with the block. In the event that there is at least one more additional component in the obtained at least portion of the offset associated with the block, the next component is considered at 414 and control is returned to step 406. Otherwise, in the event that there are no more additional components in the obtained at least portion of the offset associated with the block, control is transferred to step 418. If there are additional components in the obtained at least portion of the offset associated with the block, then steps 406 through 410 are applied to the next component (e.g., the next most significant byte) of the block.

At 418, it is determined whether there are additional blocks in the object. In the event that there is at least one more additional block in the object, the next block is considered at 416 and control is returned to step 402. Otherwise, in the event that there are no more additional blocks in the object, process 400 ends. If there are additional blocks in the object, then steps 406 through 410 are applied to the next block of the object. The "next" block can be any block of the object that was not previously considered by process 400.

In some embodiments, one object-level metadata structure is maintained for an object such that the checksum of each block of the object is indexed/stored in the single object-level metadata structure. In some embodiments, more than one object-level metadata structure is maintained for an object such that checksums of different sets of blocks of the object are indexed/stored in different object-level metadata structures belonging to that object. Using more than one object-level metadata structure per object improves the resolution to candidates when more than one block is corrupted. As an example, if there are two object-level metadata structures per object, then every even block of the object can be tracked in the first object-level metadata structure and every odd block can be tracked in the second object-level metadata structure. If two blocks of the object are corrupted and one has an odd offset and the other has an even offset, then they will both be pinpointed by their corresponding object-level metadata structures. In general, T (where T>0) object-level metadata structures may be used per object.

Figure 5:
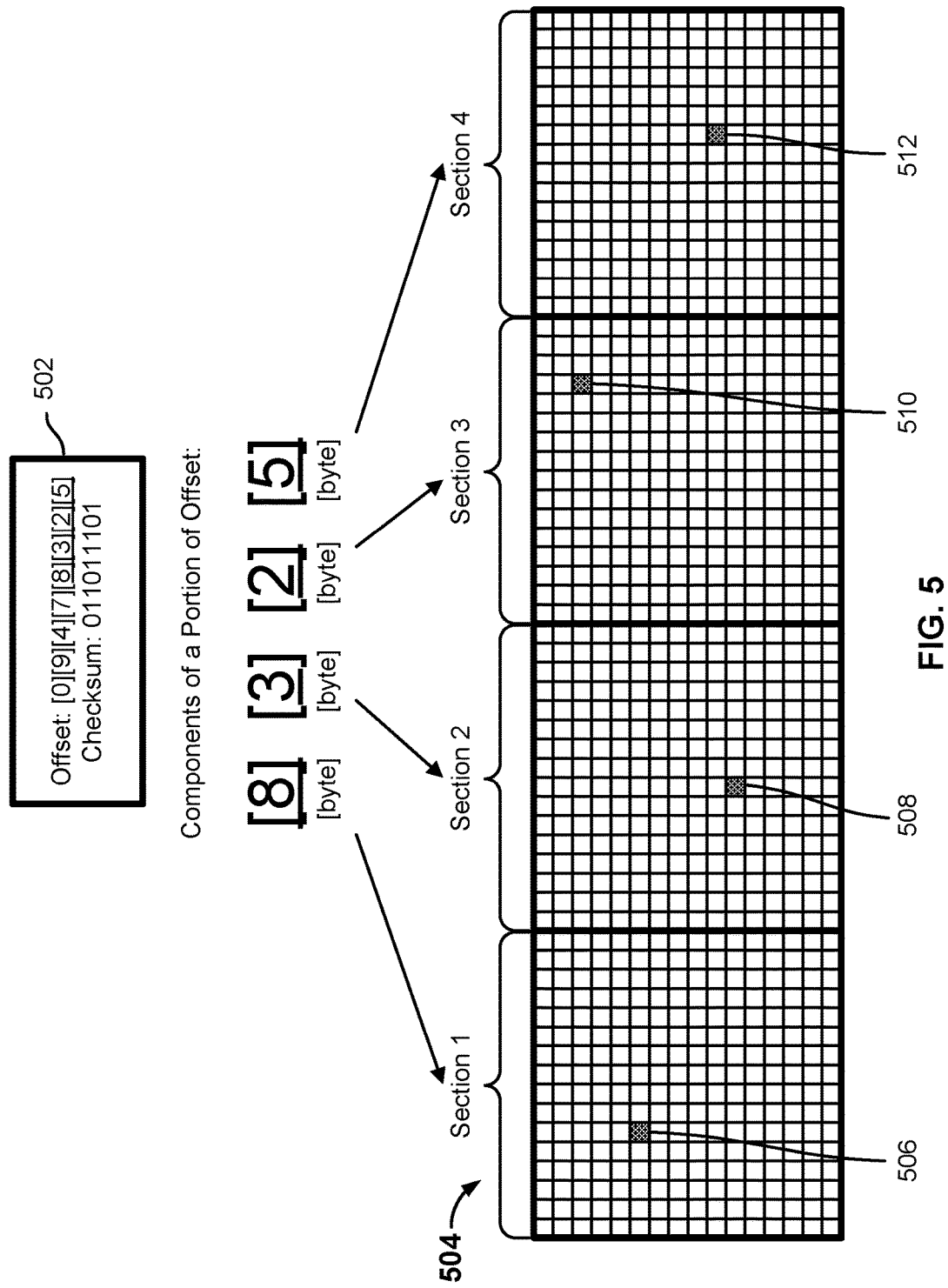
FIG. 5 is a diagram showing an example of mapping an object's block's checksum to bins in an object-level metadata structure corresponding to the object in accordance to some embodiments.

FIG. 5 is a diagram showing an example of mapping an object's block's checksum to bins in an object-level metadata structure corresponding to the object in accordance to some embodiments. A process such as process 400 of FIG. 4, above, can be used to perform the mapping of an object's block's checksum to bins in object-level metadata structure 504. In the example, object-level metadata structure 504 corresponds to an object and object-level metadata structure 504 comprises M=4 sections and each section comprises $N=2^8=256$ bins for a total of 1024 bins in object-level metadata structure 504. In some embodiments, prior to storing block checksums into object-level metadata structure 504, each bin of object-level metadata structure 504 is initialized to include a default value (e.g., a zero value). In the example of FIG. 5, the offset of block 502 is used to identify one bin from each of the M=4 sections to which to map the checksum value of block 502. In the example of FIG. 5, the offset of block 502 comprises eight values or components, each of which is represented by a byte. In the example, the four least significant bytes of the offset of block 502 ("[0][9][4][7][8][3][2][5]") are identified as "[8][3][2][5]." Each of these four least significant bytes is a component of the offset of block 502. Each component corresponds to a respective section of object-level metadata structure 504 and the value of that component can be used to identify a bin in that section that is associated with the value of the component.

Four least significant bytes of an offset=[byte 1][byte 2][byte 3][byte 4]

Each byte of the offset can be any value between 0 and 255 thus able to index 256 bins in a section.

[byte 1] [byte 2] [byte 3] [byte 4]
Section1 Section2 Section3 Section4

For example, the most significant byte of the four components is "8," which maps to Section 1 of object-level metadata structure 504 and bin 506 of Section 1. The second significant byte of the four components is "3," which maps to Section 2 of object-level metadata structure 504 and bin 508 of Section 2. The third most significant byte of the four components is "2," which maps to Section 3 of object-level metadata structure 504 and bin 510 of Section 3. The least significant byte of the four components is "5," which maps to Section 4 of object-level metadata structure 504 and bin 512 of Section 4.

In various embodiments, the checksum of block 502 is added to the combined checksum value in every bin selected for this data block. Each bin of object-level metadata structure 504 contains a value that is determined based on a combination of the checksums of all the blocks that have been mapped to that bin. For example, the combination may comprise an XOR operation or a summation operation.

In various embodiments, at any point in time, the values of the object-level metadata structure are completely determined by the current data in the object. Put another way, when any block of an object is updated/modified, a set of bins in the object-level metadata structure to which the offset of the block uniquely maps, are correspondingly updated. For example, new data being written to a block update causes an updated checksum to be determined and this updated checksum will be added to one bin in each of the M sections to modify the values stored in those bins. The set of bins modified based on an updated checksum of an updated block is uniquely determined by the offset of the block. Similarly, operations that remove data (e.g., truncate or delete) will subtract the checksum of each removed block from the object-level metadata structure from the set of bins based on the offset of the block.

Figure 6:
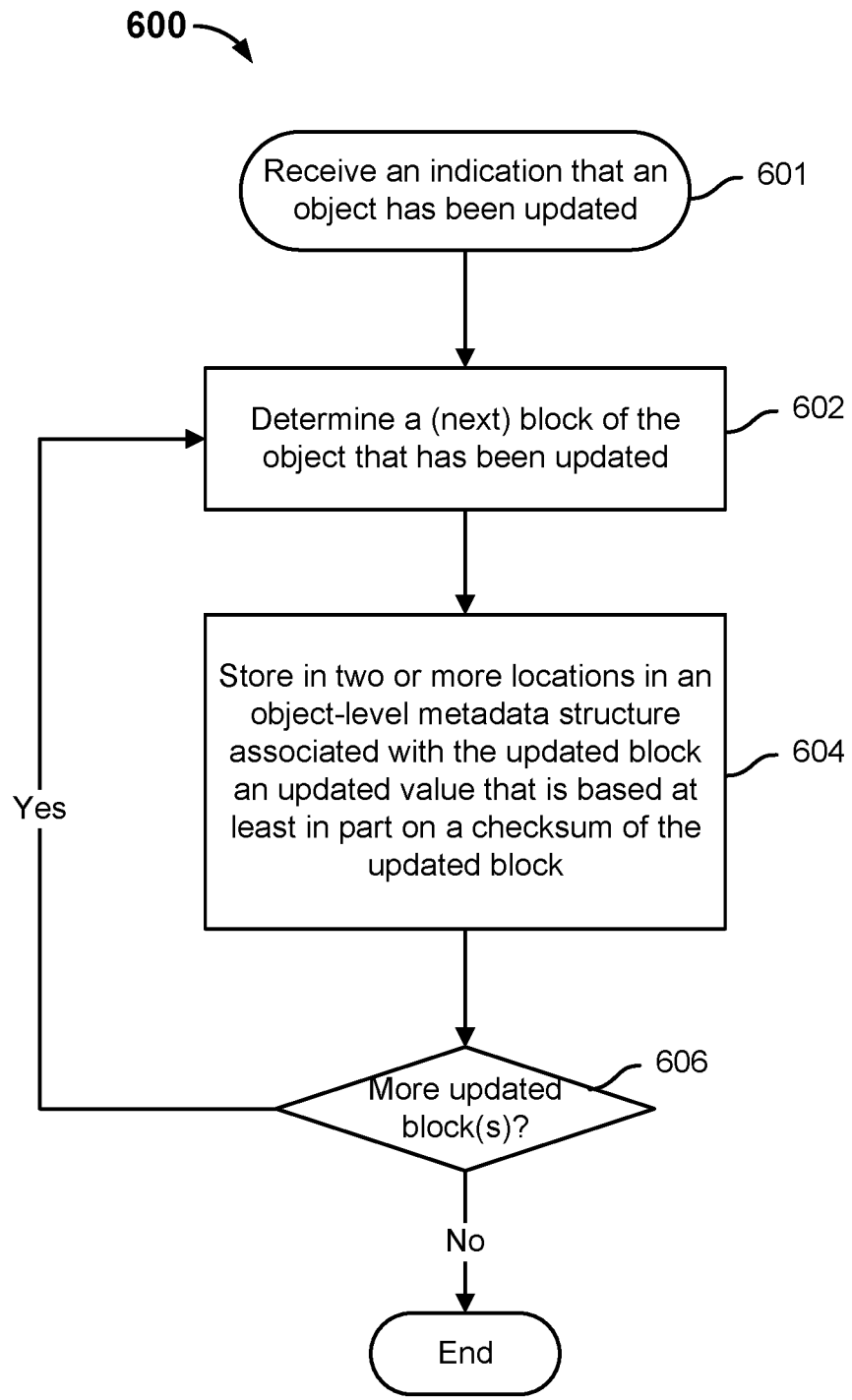
FIG. 6 is a flow diagram showing an example of a process for updating an object-level metadata structure corresponding to an object in accordance to some embodiments.

FIG. 6 is a flow diagram showing an example of a process for updating an object-level metadata structure corresponding to an object in accordance to some embodiments. In some embodiments, process 600 is implemented on a server such as server 100 of FIG. 1.

At 601, an indication that an object has been updated is received. Based on the indication, it is determined that at least one block of the data included in the object has been modified. In some embodiments, process 600 can be performed each time the object is updated so that the object-level metadata structure remains up-to-date. Capturing checksums of data as soon as they are accepted allows the object-level metadata structure to be used as an end-to-end checksum (like an application level checksum). This is different from conventional systems that calculate the data checksums when storing the data and embed it with the pointer to that block in some metadata.

At 602, a (next) block of the object that has been updated is determined.

At 604, an updated value that is based at least in part on a checksum of the updated block is stored in two or more locations in an object-level metadata structure associated with the updated block. Step 604 can be implemented using steps 402 through 414 of process 400 of FIG. 4, above.

Similar to step 402, at least a portion of an offset associated with an updated block is obtained. In some embodiments, a portion or the entirety of an offset of an updated block of the object can be considered, depending on the desired resolution of the object-level metadata structure corresponding to the object. The same at least portion of the updated block's offset that was used to generate the object-level metadata structure in a process such as process 400 of FIG. 4 above can also be used to update the object-level metadata structure at step 602.

Similar to step 404, an updated checksum associated with the updated block is obtained. The new/updated checksum associated with the updated block based on the updated content of the block can be computed and/or otherwise obtained.

Similar to step 406, a value of a component of the at least portion of the offset is determined. The value of one component of the obtained at least portion of the updated block's offset is determined.

Similar to step 408, a bin in a section included in an object-level metadata structure corresponding to the component is identified. The object-level metadata structure includes M sections, where M is the same value as the number of components that are obtained for each block offset. For example, if the least four significant bytes are obtained for the block, then M=4. Each of the M sections include N bins. For example, if each component of the obtained block offset is one byte (eight bits), then each section would have $N=2^8=256$ bins. Each bin would be associated with a corresponding identifying value from 0 to 255. The bin that is associated with the identifying value that matches the value of the current component of the obtained at least portion of the updated block's offset that is being considered is identified.

Similar to step 410, an updated value is stored in the bin in the section included in the object-level metadata structure corresponding to the component based at least in part on a previous checksum of the updated block prior to an update and the updated checksum of the updated block. The bin of the section of the object-level metadata structure to which the value of the current component maps is updated with a new value. Specifically, the previous checksum associated with the block prior to being updated is subtracted/removed from the value included in the bin and the new checksum of the updated block is combined with the accumulated value of zero or more other block checksums and stored in that bin.

For example, assume that prior to an update, a block had checksum Q and after the update, the updated block has the updated checksum of X. Prior to being updated, a bin in a section of the object-level metadata structure mapped to by the updated block's offset stored value Y. After updating the bin based on the updated checksum of the updated block, the new value stored in the bin would be Y−Q+X.

Similar to step 412, it is determined whether there are additional components in the obtained at least portion of the offset associated with the updated block. In the event that there is at least one more additional component in the obtained at least portion of the offset associated with the updated block, the next component is considered at 414 and control is returned to step 406. Otherwise, in the event that there are no more additional components in the obtained at least portion of the offset associated with the updated block, control is transferred to step 418. If there are additional components in the obtained at least portion of the offset associated with the updated block, then steps similar to 406 through 410 are applied to the next component (e.g., the next most significant component) of the updated block.

At 606, it is determined whether there are additional updated blocks in the object. In the event that there is at least one more additional updated block in the object, control is returned to step 602. Otherwise, in the event that there are no more additional updated blocks in the object, process 600 ends. If there are additional updated blocks in the object, then steps 602 and 604 are applied to the next updated block of the object. The "next" updated block can be any updated block of the object that was not previously considered by process 600.

In various embodiments, the object-level metadata structure for an object can be verified by comparing the bins of a reference object-level metadata structure to those of the object-level metadata structure that was stored with the object. In various embodiments, the reference object-level metadata structure is determined by computing a new object-level metadata structure by scanning all the object's existing blocks. All bins that are different between the reference object-level metadata structure and the stored object-level metadata structure correspond to pieces of identifying information (e.g., block offsets) associated with blocks that might be corrupted. The actual block offsets can be derived from the mismatching bins by applying the reverse mapping logic between bins and the offset of a block.

Figure 7:
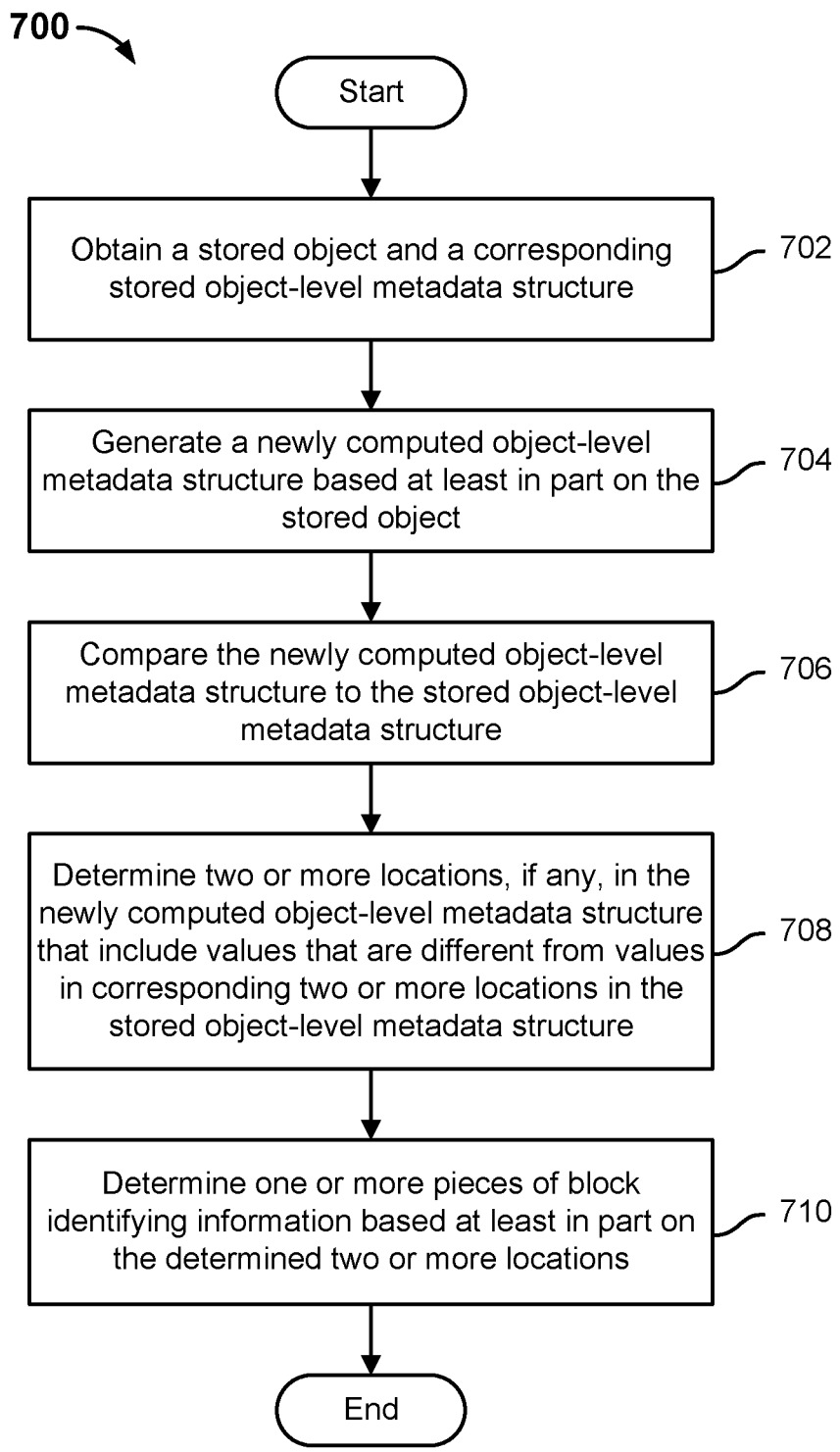
FIG. 7 is a flow diagram showing an example of a process for updating an object-level metadata structure corresponding to an object in accordance to some embodiments.

FIG. 7 is a flow diagram showing an example of a process for updating an object-level metadata structure corresponding to an object in accordance to some embodiments. In some embodiments, process 700 is implemented on a server such as server 100 of FIG. 1.

For example, process 700 may be performed in response to reading a stored object from storage and/or receiving a transfer of a stored object (e.g., during a replication process). Process 700 may be used to validate the integrity of a stored object in a live system in real-time. In some embodiments, a "real-time" process refers to a process that can be performed on demand. In some embodiments, a "live system" refers to a system in which the objects are capable of being accessed and potentially updated.

At 702, a stored object and a corresponding stored object-level metadata structure are obtained. An object can be stored with a corresponding stored object-level metadata structure that was previously determined for the object. Whether the stored object includes any data corruptions at the block-level can be determined by computing a new object-level metadata structure based on the version of the object that was recovered from storage and/or received from a source storage system; and comparing the newly computed object-level metadata structure to the version of the object-level metadata structure that was recovered from storage or through a transmission.

At 704, a newly computed object-level metadata structure is generated based at least in part on the stored object. In some embodiments, the newly computed object-level metadata structure can be computed based on the block checksums that are stored with the object. In some embodiments, the newly computed object-level metadata structure can be computed based on first generating checksums based on reading the actual blocks of data of the object and then generating the new object-level metadata structure based on the generated block checksums. In various embodiments, the newly computed object-level metadata structure has the same size and layout as the stored object-level metadata structure. Both embodiments of computing a new object-level metadata structure will be described with FIGS. 8 and 9 below. In some embodiments, prior to storing values based on block checksums, the new object-level metadata structure is initialized such that each bin is made to contain a default value. In various embodiments, the new object-level metadata structure can be computed using a process such as process 400 of FIG. 4.

At 706, the newly computed object-level metadata structure is compared to the stored object-level metadata structure. Each bin in the newly computed object-level metadata structure is compared to a corresponding bin in the stored object-level metadata structure to determine whether a discrepancy exists between the values that are stored in both bins. For example, the value in bin 43 in section 1 of the newly computed object-level metadata structure is compared to bin 43 in section 1 of the stored object-level metadata structure to determine whether two corresponding bins include the same or different values.

At 708, two or more locations, if any, in the newly computed object-level metadata structure that include values that are different from values in corresponding two or more locations in the stored object-level metadata structure are determined. Two or more bins across two or more corresponding sections of the newly computed object-level metadata structure that contain different values from the corresponding two or more bins across two or more corresponding sections of the stored object-level metadata structure are identified. Each bin in a section is associated with a corresponding identifying value (which is not the same as the combined block checksum value that is contained/stored in the bin).

At 710, one or more pieces of block identifying information are determined based at least in part on the two or more locations. The identifying values of the bins in the newly computed object-level metadata structure can be used to identify one or more offsets of blocks that are potentially associated with data corruption in the object.

For example, if the four least significant components of a block's offset were used to map the block's checksum to various bins in the object-level metadata structure, then each bin with a discrepancy in different sections of the newly computed object-level metadata structure can be mapped back to offsets of blocks that are potentially associated with data corruption. For example, if the newly computed object-level metadata structure (M=4 and N=256) included discrepancies with the stored object-level metadata structure at bin 3 in section 1, bin 63 in section 2, bin 56 in section 3, and bin 100 in section 4, then a block of the object with the offset that includes [3] [63] [56] [100] can be identified as a block with a potential data corruption.

In some embodiments, one bin discrepancy in each section of the newly computed object-level metadata structure can be uniquely mapped back to one block's offset. In some embodiments, multiple bin discrepancies in each section of the newly computed object-level metadata structure can be mapped to a set of more than one blocks that are associated with potential errors. Blocks that are identified to potentially include errors can be used to identify lost writes, reordered blocks, and blocks with possible data corruption. Whether at least some of the identified blocks are contiguous or not contiguous can also be used in the debugging process.

In one use case, one or more blocks of an object that are identified as being associated with data corruption can be quickly retransmitted from a safe (i.e., a known, correct) copy of the object (e.g., stored at a source storage system) instead of retransmitting the entire object.

In various embodiments, at all times, the object-level metadata structure represents the checksums for all the blocks written in the object. This property can be used to maintain checksums for a "snapshot" version of an object as well, e.g., a read-only snapshot of the object can contain a copy of the object's object-level metadata structure state when the snapshot is taken. Since the current values of the object-level metadata structure can simply be saved as a part of the snapshot, the object-level metadata structure does not need to be recomputed specifically for a newly created snapshot. Similarly, when a snapshot is made writeable (e.g., a clone is generated from the snapshot), a copy of the snapshot's existing object-level metadata structure can be made and then updated in response to any changes made to the clone. Put another way, a snapshot or a clone of an object can inherit the object's object-level metadata structure, which makes it very easy to maintain checksums for all versions of the object.

Figure 8:
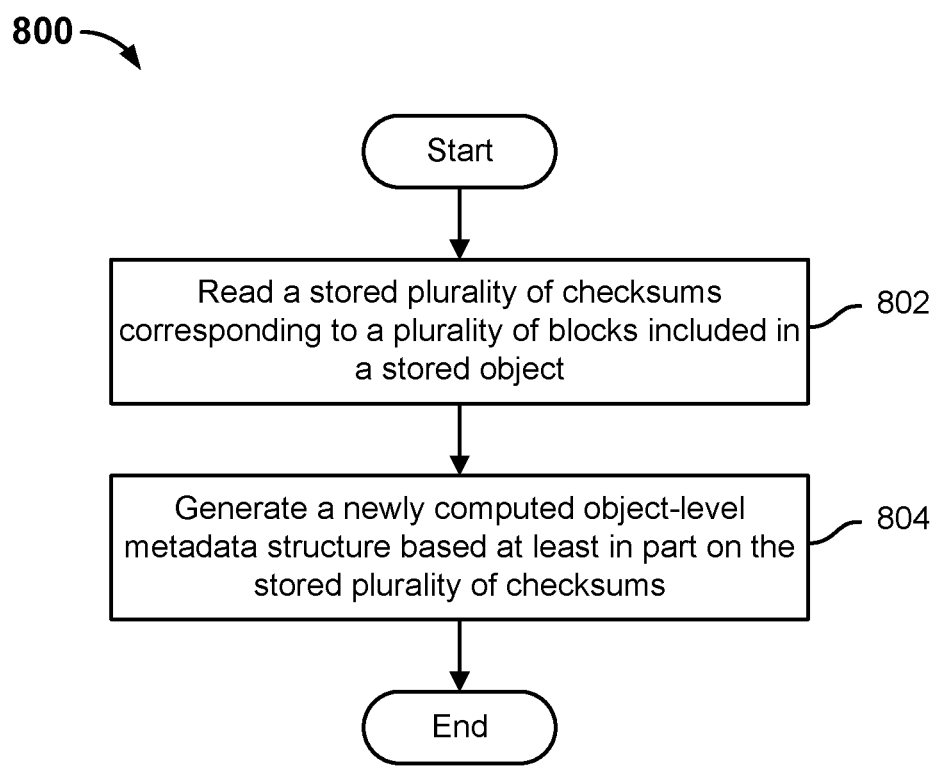
FIG. 8 is a flow diagram showing a first example of a process for generating a newly computed object-level metadata structure corresponding to a stored object in accordance to some embodiments.
Figure 9:
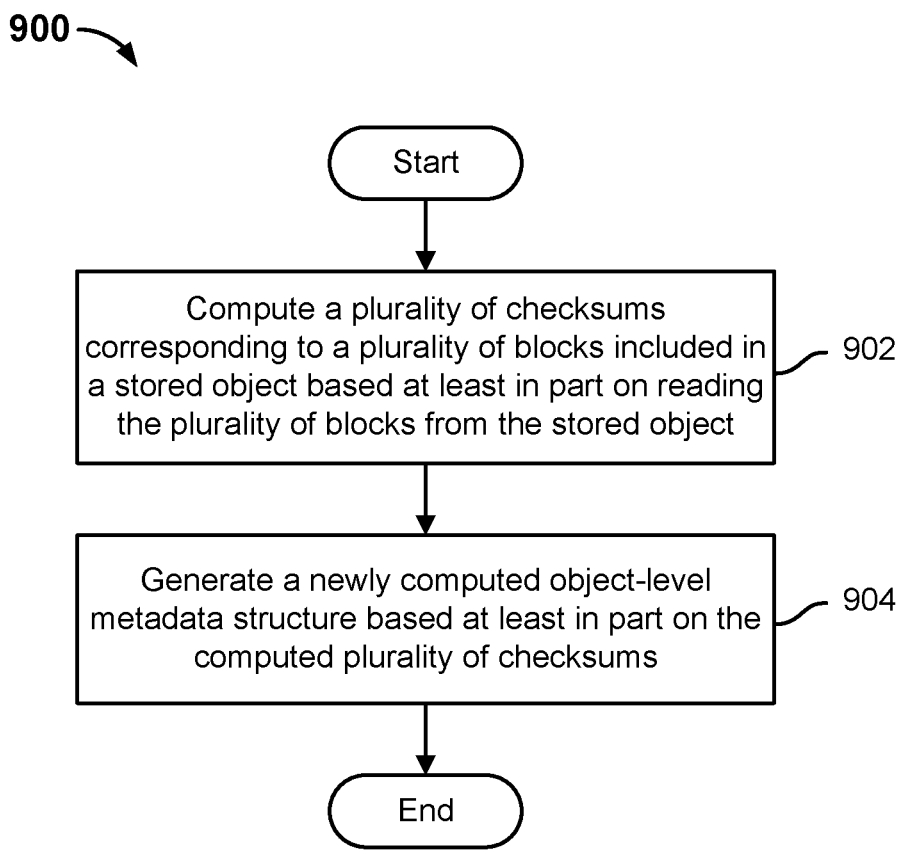
FIG. 9 is a flow diagram showing a second example of a process for generating a newly computed object-level metadata structure corresponding to a stored object in accordance to some embodiments.

FIGS. 8 and 9, below, describe two different example processes for generating a newly computed object-level metadata structure corresponding to a stored object. Process 800 of FIG. 8 and process 900 of FIG. 9 can alternatively be used to implement step 704 of process 700 of FIG. 7, above.

FIG. 8 is a flow diagram showing a first example of a process for generating a newly computed object-level metadata structure corresponding to a stored object in accordance to some embodiments. In some embodiments, process 800 is implemented on a server such as server 100 of FIG. 1. In some embodiments, step 704 of process 700 of FIG. 7 above can be implemented using a process such as process 800.

In various embodiments, a stored object is also stored with metadata such as computed checksums corresponding to respective ones of the object's blocks of data.

At 802, a stored plurality of checksums corresponding to a plurality of blocks included in a stored object is read. In process 800, the stored checksums corresponding to the blocks of the object are read from storage.

At 804, a newly computed object-level metadata structure is generated based at least in part on the stored plurality of checksums. A process such as process 400 of FIG. 4, above, can be used to compute a new object-level metadata structure based on the block checksums that are recovered from the storage.

One benefit of using process 800 is that it is a relatively computationally efficient process because it takes advantage of the previously computed block checksums that are stored with the object. A possible drawback of using process 800 is that the previously computed block checksums that are stored with the object are assumed to be reliable but if data corruption had been introduced to the stored checksums, then the stored checksums may not accurately reflect the actual content of the blocks of data with which they are associated.

FIG. 9 is a flow diagram showing a second example of a process for generating a newly computed object-level metadata structure corresponding to a stored object in accordance to some embodiments. In some embodiments, process 900 is implemented on a server such as server 100 of FIG. 1. In some embodiments, step 704 of process 700 of FIG. 7 above can be implemented using a process such as process 900.

At 902, a plurality of checksums corresponding to a plurality of blocks included in a stored object is computed based at least in part on reading the plurality of blocks from the stored object. In process 900, any checksums corresponding to the blocks of the stored object that are stored with the object are ignored and instead, checksums corresponding to the blocks are recomputed based on the content read from the blocks.

At 904, a newly computed object-level metadata structure is generated based at least in part on the computed plurality of checksums. A process such as process 400 of FIG. 4 above can be used to compute a new object-level metadata structure based on the recomputed block checksums.

One benefit of using process 900 is that the block checksums that are used to generate the newly computed object-level metadata structure accurately reflect the actual content read from the blocks of the object. A possible drawback of using process 900 is that the process can be computationally expensive as it computes the checksum of each block in the stored object.

Figure 10:
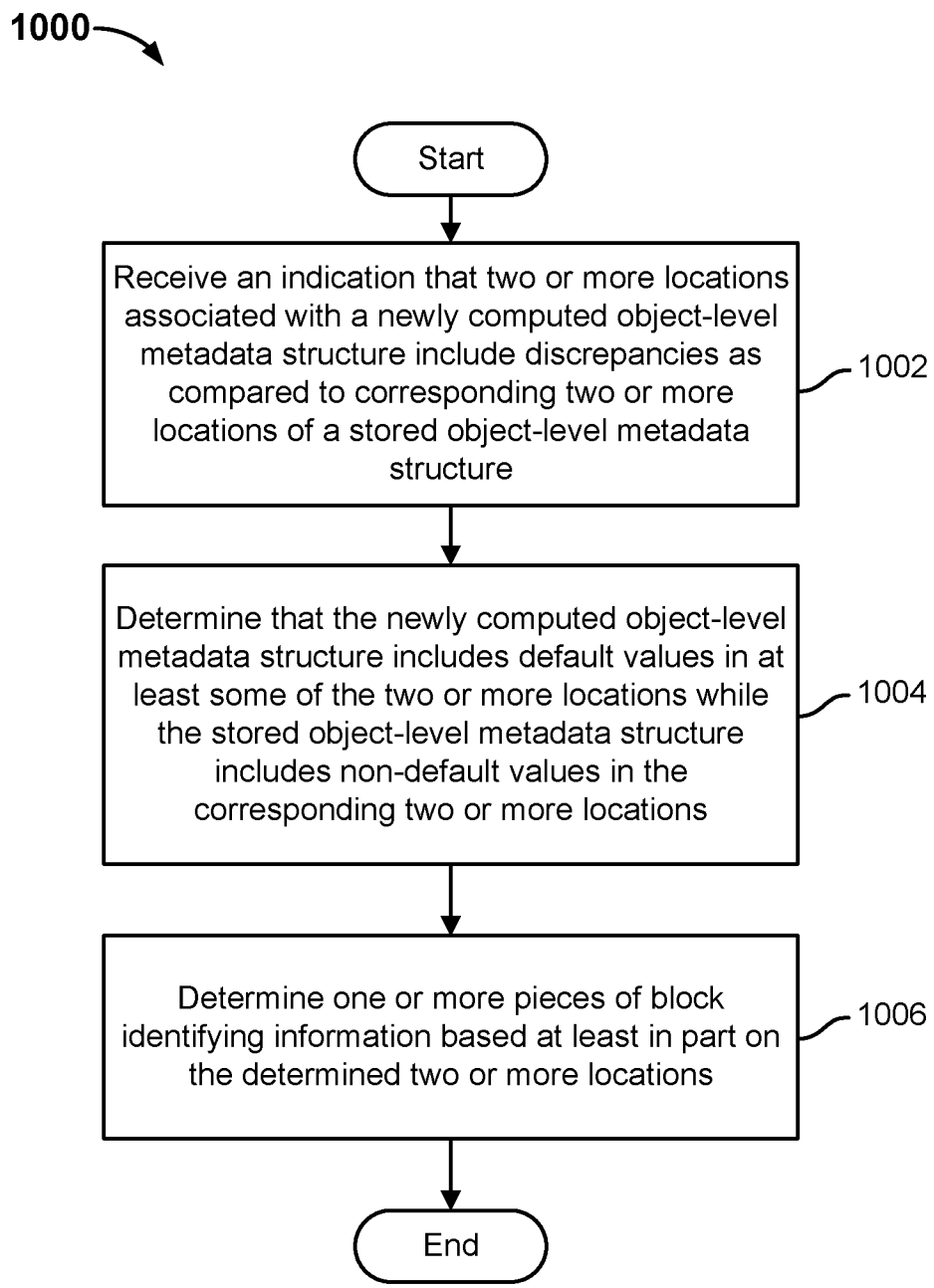
FIG. 10 is a flow diagram showing an example of a process for identifying a potential lost write with respect to a stored object in accordance to some embodiments.

FIG. 10 is a flow diagram showing an example of a process for identifying a potential lost write with respect to a stored object in accordance to some embodiments. In some embodiments, process 1000 is implemented on a server such as server 100 of FIG. 1. In some embodiments, step 708 of process 700 of FIG. 7 above can be implemented using process 1000.

Process 1000 can be used to potentially detect a particular type of error that is associated with a "lost write" to a sparse portion of an object. In various embodiments, a "sparse portion" of an object refers to a portion of the object for which several blocks do not include user data. A lost write occurs when a write operation that is intended to be made to a sparse portion of an object is not performed on the object due to an error but the object's corresponding object-level metadata structure is updated with the checksums of the data blocks as if they had been modified by the write operation. Put another way, the updated block checksums related to the blocks affected by the write operation are stored in the object-level metadata structure of the object but the write operation itself was not performed on the stored object. One example reason for how a lost write could occur is as follows: The object-level metadata is updated with an incoming write very early in the writing process, almost as early as the write request arrives. As soon as the write request arrives, the corresponding checksum is computed and the affected object-level metadata is updated. This reduces the risk of failing to update the object-level metadata due to software or hardware errors. The actual write request to the relevant region of the object occurs by processing the write request through various software and hardware layers. The write request must be processed in various layers of the software and finally by hardware and firmware comprising the storage media (e.g., hard disk drives or solid state drives). Anywhere in these layers, an error may occur that can causes the actual write to be silently dropped.

At 1002, an indication that two or more locations associated with a newly computed object-level metadata structure include discrepancies as compared to corresponding two or more locations of a stored object-level metadata structure is received.

At 1004, it is determined that the newly computed object-level metadata structure includes default values in at least some of the two or more locations while the stored object-level metadata structure includes non-default values in the corresponding two or more locations.

In the event of a lost write, bins in the stored object-level metadata structure corresponding to that object that are mapped to by sparse blocks' offsets include non-default values (e.g., non-zero values) that were determined from the updated checksums of the blocks that should have been affected by the write operation.

Because of the occurrence of the lost write, the blocks in the object's sparse portion were never affected by the write operation and therefore remain empty/sparse. As such, bins in the newly computed object-level metadata structure corresponding to that object that are mapped to by those sparse blocks still include the default values (e.g., zero values) with which the newly computed object-level metadata structure was initialized.

As such, in the event that bins with discrepancies are determined when the newly computed object-level metadata structure is compared to the stored object-level metadata structure and that in at least some of such discrepancies, the bins in the newly computed object-level metadata structure include default values while the bins in the stored object-level metadata structure include non-default values, then it can be determined that a lost write could have potentially occurred.

At 1006, one or more pieces of block identifying information are determined based at least in part on the determined two or more locations.

In particular, if the bins associated with discrepancies between the newly computed object-level metadata structure and the stored object-level metadata structure are also such that the bins in the newly computed object-level metadata structure included default values while the corresponding bins in the stored object-level metadata structure included non-default values, then such bins can be mapped back to offsets of blocks that are potentially associated/affected by a lost write operation.

Identifying the blocks of an object that are potentially associated with/affected by a lost write operation can be used to more precisely debug the software/hardware associated with storing the object.

Figure 11:
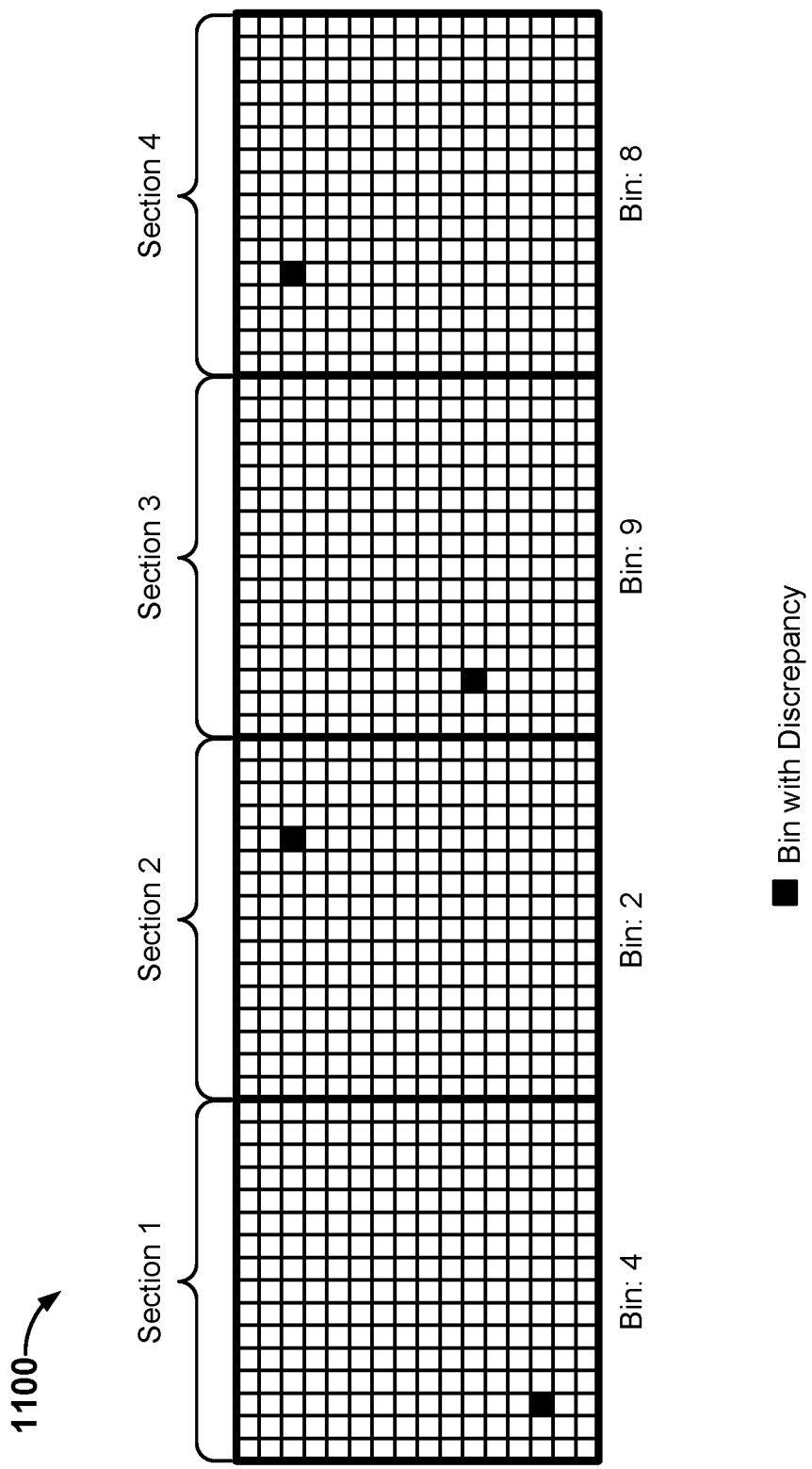
FIG. 11 is a diagram showing an example of identifying a block of an object that is associated with data corruption as determined by a validation process on an object-level metadata structure in accordance to some embodiments.

FIG. 11 is a diagram showing an example of identifying a block of an object that is associated with data corruption as determined by a validation process on an object-level metadata structure in accordance to some embodiments. In the example, newly computed object-level metadata structure 1100 was generated for a stored object during a process of validating that object, such as process 700 of FIG. 7, above. Newly computed object-level metadata structure 1100 includes four sections and 256 bins in each section, where each bin is associated with an identifying value from 0 to 255. By comparing the value stored in each bin of newly computed object-level metadata structure 1100 to the value stored in each corresponding bin in the stored object-level metadata structure (not shown), bins in newly computed object-level metadata structure 1100 that include different values than those of their corresponding bins in the stored object-level metadata structure are identified as bins with discrepancies. In the example, bin 4 of Section 1 includes a discrepancy, bin 2 of Section 2 includes a discrepancy, bin 9 of Section 3 includes a discrepancy, and bin 8 of Section 4 includes a discrepancy. In the example, assume that Section 1 corresponds to the most significant component/byte in the four least most significant components of a block offset, Section 2 corresponds to the second most significant component/byte in the four least most significant components of a block offset, Section 3 corresponds to the third most significant component/byte in the four least most significant components of a block offset, and Section 4 corresponds to the least significant component/byte in the four least most significant components of a block offset. As such, the bin discrepancies across the four sections of newly computed object-level metadata structure 1100 can be mapped back to a block of the stored object with an offset that ends with "[4][2][9][8]." As such, the block with an offset that ends with "[4][2][9][8]" is identified as being corrupted. This information can be used to debug the software and/or hardware that is associated with storing the object and/or used to determine that the block with an offset that ends with "[4][2][9][8]" should be retransmitted from a known safe copy of the stored object (instead of retransmitting the entire safe copy of the stored object).

Figure 12:
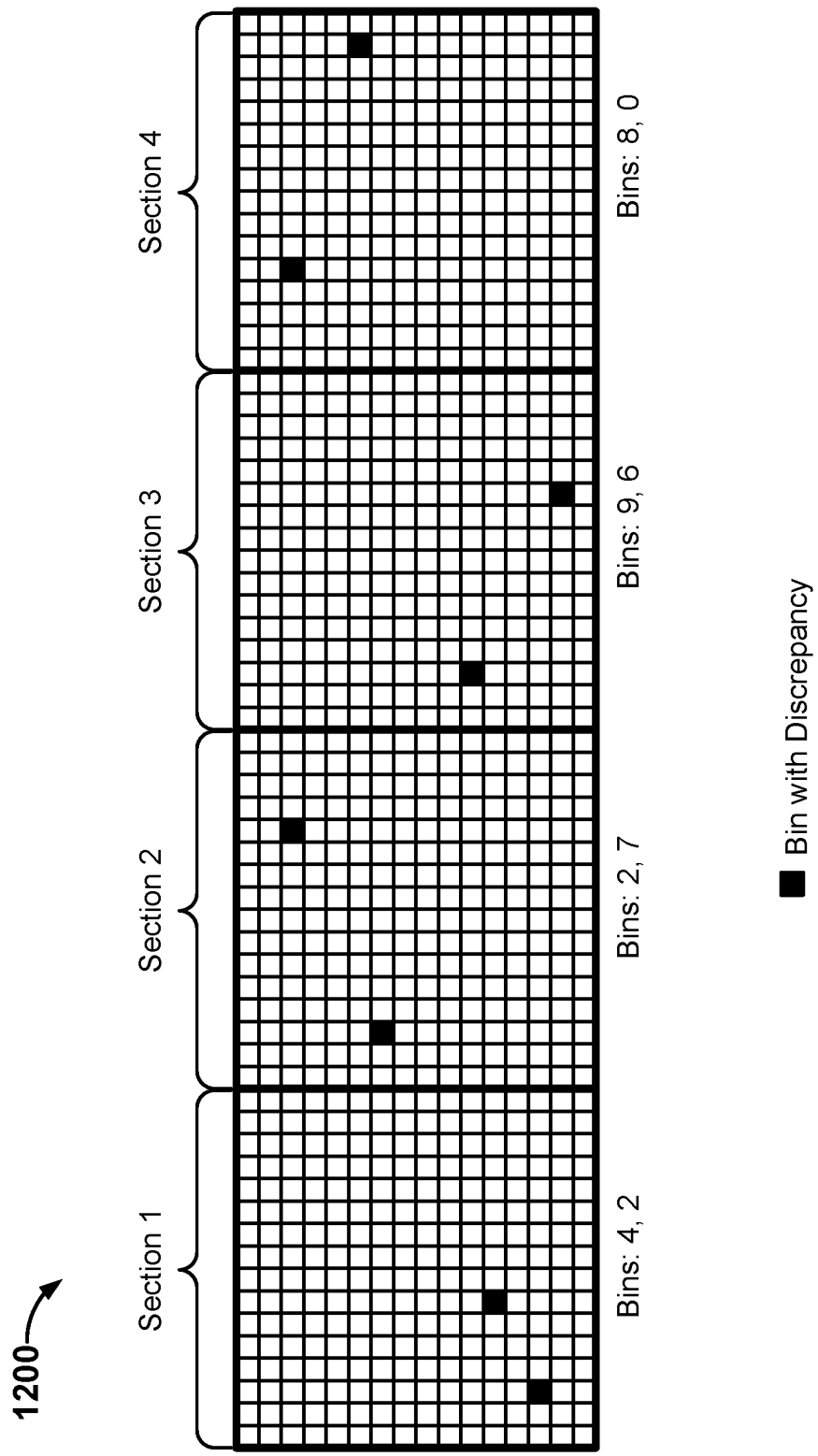
FIG. 12 is a diagram showing an example of identifying multiple blocks of an object that are potentially associated with data corruption as determined by a validation process on an object-level metadata structure in accordance to some embodiments.

FIG. 12 is a diagram showing an example of identifying multiple blocks of an object that are potentially associated with data corruption as determined by a validation process on an object-level metadata structure in accordance to some embodiments. In the example, newly computed object-level metadata structure 1200 was generated for a stored object during a process of validating that object, such as process 700 of FIG. 7, above. Newly computed object-level metadata structure 1200 includes four sections and 256 bins in each section, where each bin is associated with an identifying value from 0 to 255. By comparing the value stored in each bin of newly computed object-level metadata structure 1200 to the value stored in each corresponding bin in the stored object-level metadata structure (not shown), bins in newly computed object-level metadata structure 1200 that include different values than those of their corresponding bins in the stored object-level metadata structure are identified as bins with discrepancies. In the example, bins 4 and 2 of Section 1 include discrepancies, bins 2 and 7 of Section 2 include discrepancies, bins 9 and 6 of Section 3 include discrepancies, and bins 8 and 0 of Section 4 include discrepancies. In the example, assume that Section 1 corresponds to the most significant component/byte in the four least most significant components of a block offset, Section 2 corresponds to the second most significant component/byte in the four least most significant components of a block offset, Section 3 corresponds to the third most significant component/byte in the four least most significant components of a block offset, and Section 4 corresponds to the least significant component/byte in the four least most significant components of a block offset.

Given that there are multiple (K=2) bins with discrepancies in each section, there are $K^M=2^4=16$ different permutations of arranging the identifying values of the identified bins and therefore 16 offsets of blocks that are potentially associated with data corruption. In particular, in this example, the blocks of the object associated with the following last four components may be associated with data corruption:

[4][2][9][8]
[4][2][9][0]
[4][2][6][8]
[4][2][6][0]
[4][7][9][8]
[4][7][9][0]
[4][7][6][8]
[4][7][6][0]
[2][2][9][8]
[2][2][9][0]
[2][2][6][8]
[2][2][6][0]
[2][7][9][8]
[2][7][9][0]
[2][7][6][8]
[2][7][6][0]

While not all blocks associated with the 16 offsets with the last four components as listed above are necessarily corrupt, the identification of such blocks can be used to debug the software and/or hardware that is associated with storing the object and/or used to determine that the blocks with these 16 offsets should be retransmitted from a known safe copy of the stored object (instead of retransmitting the entire safe copy of the stored object).

As described herein, an object-level metadata structure associated with an object comprises a lightweight mechanism to track the current checksums of the blocks of the object. The object-level metadata structure associated with the object can also be used to identify data corruption at the block-level, which can assist a precise debugging process and/or identify only specific blocks of data to be retransmitted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a memory configured to store an object-level metadata structure corresponding to a stored object, wherein the stored object comprises a plurality of blocks, wherein the object-level metadata structure comprises a plurality of sections; and
   a processor coupled to the memory and configured to:
      determine a piece of identifying information associated with a block included in the plurality of blocks, wherein the piece of identifying information associated with the block comprises a plurality of components;
      determine a first location among a plurality of locations within a first section of the plurality of sections of the object-level metadata structure based at least in part on a first component of the plurality of components of the piece of identifying information associated with the block;

compute a value based at least in part on a checksum corresponding to the block; and store the value in the first location within the first section of the plurality of sections of the object-level metadata structure.

2. The system of claim 1, wherein the processor is further configured to initialize the object-level metadata structure by causing the plurality of locations of the object-level metadata structure to store a default value.

3. The system of claim 1, wherein the piece of identifying information of the block comprises an offset of the block.

4. The system of claim 1, wherein the piece of identifying information of the block comprises a unique location vector of the block.

5. The system of claim 1, wherein the value comprise a first value, wherein the plurality of locations comprises a first plurality of locations, and wherein the processor is configured to determine a second location among a second plurality of locations within a second section of the plurality of sections of the object-level metadata structure based at least in part on a second component of the plurality of components of the piece of identifying information associated with the block, wherein the first section is different from the second section.

6. The system of claim 5, wherein determinations of the first location and the second location are unique to the piece of identifying information of the block.

7. The system of claim 1, wherein to store the value in the first location comprises to add to a previously stored value reflecting zero or more other blocks at least the checksum corresponding to the block.

8. The system of claim 1, wherein the processor is further configured to:

determine that the block has been updated;

obtain an updated checksum corresponding to the updated block;

remove the checksum corresponding to the block from the value stored in the first location within the first section of the plurality of sections of the object-level metadata structure; and determine a new value to store in the first location based at least in part on the updated checksum corresponding to the updated block and the value less the checksum corresponding to the block.

9. The system of claim 1, wherein the first location is included in a first set of locations, and wherein the processor is further configured to:

obtain a reference object-level metadata structure;

determine a second set of locations, if any, in the reference object-level metadata structure that includes one or more values that are different from corresponding one or more values in the first set of locations in the object-level metadata structure obtained from the memory; and determine one or more pieces of block identifying information based at least in part on the determined second set of locations.

10. The system of claim 9, wherein the processor is further configured to:

obtain the stored object from the memory;

obtain the object-level metadata structure corresponding to the stored object from the memory; and generate a newly computed object-level metadata structure based at least in part on the stored object obtained from the memory, wherein the reference object-level metadata structure comprises the newly computed object-level metadata structure.

11. The system of claim 10, wherein to generate the newly computed object-level metadata structure based at least in part on the stored object obtained from the memory comprises to:

obtain a plurality of checksums corresponding to respective ones of the plurality of blocks from the memory; and generate the newly computed object-level metadata structure based at least in part on the plurality of checksums obtained from the memory.

12. The system of claim 10, wherein to generate the newly computed object-level metadata structure based at least in part on the stored object obtained from the memory comprises to:

generate a plurality of checksums corresponding to respective ones of the plurality of blocks by reading the plurality of blocks from the memory; and generate the newly computed object-level metadata structure based at least in part on the generated plurality of checksums.

13. A method, comprising:

storing an object-level metadata structure corresponding to a stored object, wherein the stored object comprises a plurality of blocks, wherein the object-level metadata structure comprises a plurality of sections;

determining a piece of identifying information associated with a block included in the plurality of blocks wherein the piece of identifying information associated with the block comprises a plurality of components;

determining a first location among a plurality of locations within a first section of the plurality of sections of the object-level metadata structure based at least in part on a first component of the plurality of components of the piece of identifying information associated with the block;

computing a value based at least in part on a checksum corresponding to the block; and storing the value in the first location within the first section of the plurality of sections of the object-level metadata structure.

14. The method of claim 13, wherein storing the value in the first location comprises adding to a previously stored value reflecting zero or more other blocks at least the checksum corresponding to the block.

15. The method of claim 13, further comprising:

determining that the block has been updated;

obtaining an updated checksum corresponding to the updated block;

removing the checksum corresponding to the block from the value stored in the first location within the first section of the plurality of sections of the object-level metadata structure; and determining a new value to store in the first location based at least in part on the updated checksum corresponding to the updated block and the value less the checksum corresponding to the block.

16. The method of claim 13, wherein the first location is included in a first set of locations, and further comprising:

obtaining a reference object-level metadata structure;

determining a second set of locations, if any, in the reference object-level metadata structure that includes one or more values that are different from corresponding one or more values in the first set of locations in the object-level metadata structure obtained from a memory; and determining one or more pieces of block identifying information based at least in part on the determined second set of locations.

17. A computer program product, the computer program product being embodied in a non-transitory computer readable storage medium and comprising computer instructions for:

storing an object-level metadata structure corresponding to a stored object, wherein the stored object comprises a plurality of blocks, wherein the object-level metadata structure comprises a plurality of sections;

determining a piece of identifying information associated with a block included in the plurality of blocks, wherein the piece of identifying information associated with the block comprises a plurality of components;

determining a first location among a plurality of locations within a first section of the plurality of sections of the object-level metadata structure based at least in part on a first component of the plurality of components of the piece of identifying information associated with the block;

computing a value based at least in part on a checksum corresponding to the block; and storing the value in the first location within the first section of the plurality of sections of the object-level metadata structure.

* * * * *